United States Patent [19]
Taylor et al.

[11] Patent Number: 5,783,626
[45] Date of Patent: Jul. 21, 1998

[54] WATERBORNE POLYMERS WITH PENDANT CROSSLINKABLE GROUPS

[76] Inventors: James Wayne Taylor, 1016 Forrest Ridge Dr., Kingsport, Tenn. 37660; Martha Jean Collins, 228 Southridge Dr., Blountville, Tenn. 37617

[21] Appl. No.: 616,866

[22] Filed: Mar. 15, 1996

Related U.S. Application Data

[63] Continuation-in-part of Ser. No. 420,545, Apr. 12, 1995, abandoned.

[51] Int. Cl.$^6$ .................................................. C08L 33/14
[52] U.S. Cl. .......................... 524/555; 524/533; 525/153; 525/154; 525/293; 525/300; 525/303; 525/329.9; 526/312; 526/316
[58] Field of Search .......................... 526/312, 316; 525/329.9, 300, 303, 153, 154; 524/555, 533

[56] References Cited

U.S. PATENT DOCUMENTS

| | | | |
|---|---|---|---|
| 3,219,610 | 11/1965 | Tillson | 260/29.6 |
| 3,629,169 | 12/1971 | Bedighian | 260/22 |
| 3,950,287 | 4/1976 | Coats et al. | 260/22 |
| 4,033,920 | 7/1977 | Isozaki et al. | 260/29.6 |
| 4,077,931 | 3/1978 | Leitheiser et al. | 260/29.6 |
| 4,244,850 | 1/1981 | Mylonakis | 260/29.6 |
| 4,251,406 | 2/1981 | Heiberger | 260/22 |
| 4,925,893 | 5/1990 | Padget et al. | 524/337 |
| 4,988,762 | 1/1991 | Overbeek et al. | 524/839 |
| 5,002,998 | 3/1991 | Carey et al. | 524/555 |
| 5,221,581 | 6/1993 | Palmer et al. | 428/428.8 |
| 5,227,423 | 7/1993 | Ingle | 524/458 |
| 5,264,482 | 11/1993 | Taylor et al. | 524/548 |
| 5,364,891 | 11/1994 | Pears et al. | 522/149 |
| 5,371,148 | 12/1994 | Taylor et al. | 525/293 |
| 5,378,757 | 1/1995 | Blount et al. | 524/608 |
| 5,484,849 | 1/1996 | Bors et al. | 524/533 |

FOREIGN PATENT DOCUMENTS

| | | |
|---|---|---|
| 0 297 781 A2 | 1/1989 | European Pat. Off. . |
| 0 492 847 A2 | 7/1992 | European Pat. Off. . |
| 0 634 425 A1 | 1/1995 | European Pat. Off. . |
| 2206591 | 7/1988 | United Kingdom . |
| 95/02019 | 7/1994 | WIPO . |

OTHER PUBLICATIONS

Lee and Rudin Makromol. Chem., Rapid Commun. 10, 655, (1989).

Moszner, Salz, and Rheinberger, "Reaction behaviour of monomeric β-ketoesters", Polymer Bulletin, 32, 419–426 (Apr., 1994).

*Primary Examiner*—Andrew E.C. Merriam
*Attorney, Agent, or Firm*—Rose M. Allen; Bernard J. Graves; Harry J. Gwinnell

[57] ABSTRACT

Provided are allyl-functional polymers having pendant enamine moieties and preferably also possessing pendant methacrylate groups. The presence of such groups in the polymer allows for a free-radical crosslinking reaction to take place during film formation and provides coatings having superior solvent resistance. Amino-containing waterborne particles can be prepared by reacting propylene imine with carboxylic acid-containing latexes. The amino-functionalized latexes are subsequently reacted at room temperature with for example acetoacetoxyethyl methacrylate. During ambient and thermal cure studies, clear films exhibited significant increases in solvent resistance, gel fraction, and crosslink density.

19 Claims, 3 Drawing Sheets

WATERBORNE POLYMERS WITH PENDANT CROSSLINKABLE GROUPS

CROSS-REFERENCE TO RELATED APPLICATION

This application is a continuation-in-part application of U.S. Ser. No. 08/420,545, filed on Apr. 12, 1995, now abandoned, incorporated herein by reference.

FIELD OF THE INVENTION

This invention belongs to the field of polymer chemistry. In particular, it relates to polymers having pendant enamine and ethylenic unsaturation moieties.

BACKGROUND OF THE INVENTION

Aqueous emulsion polymers or latexes in both clear and pigmented form are well-known. Examples of their uses include interior and exterior architectural coatings, general metal coatings, adhesives, and the like. Latexes can be formed by aqueous emulsion polymerization of ethylenically unsaturated monomers such as styrene, butyl acrylate, methyl methacrylate, vinyl acetate, vinyl 2-ethylhexanoate, acrylic acid, acrylonitrile, glycidyl methacrylate, 2-hydroxyethyl acrylate and the like. When ethylenically unsaturated monomers that contain a polar functionality such as the carboxyl group in acrylic acid, and/or the hydroxyl group in 2-hydroxyethyl acrylate, are used, there is a propensity for these groups to be found at or near the surface of the emulsion particles because of the affinity of these groups for the aqueous environment. In addition, techniques for increasing the amount of any non-water reactive functional group near the surface of the emulsion particles are known to those skilled in the art of emulsion polymerization. Illustrative of such techniques is the production of a core and shell latex in which the core of the particles has a given composition that may contain a small amount of the functional groups or be devoid of them and the shell or outer layers of the particles have a different composition which may be rich in the functional groups. The large number of independent variables which can be manipulated in designing latex particles renders the preparation of improved latexes problematic.

Film properties can be greatly improved if the polymers can be crosslinked after film formation.

The preparation of emulsion polymers containing "dangling" or pendant double bonds is one possible solution for a coating system which crosslinks ambiently, thermally, and photochemically. However, this is difficult to achieve since the emulsion polymerization process would be expected to also involve free-radical polymerization with such double bonds. While emulsion polymers allow one to prepare high molecular weight polymers at low viscosity, waterborne polymer particles which contain unsaturation allow one the flexibility to later crosslink the coating under a variety of cure conditions. The use of "allylic" groups as vehicles to cure oil-based paints has been used in alkyd resin systems for years. Alkyds are esterified resins prepared from polyols, dicarboxylic acids, and fatty acids. Dangling double bonds in alkyd resins are contained in the fatty acid portion of the resins. Double bonds are referred to herein as "dangling" because they are contained in the side chains of the polymer, and are not contained in its backbone. The reaction of oxygen and allylic hydrogen atoms to form peroxides in the fatty acid portion of the resin starts the crosslinking chemistry. A so-called "drier" in the coating, typically, a cobalt salt, decomposes the peroxide to active hydroxyl and organic radicals at room temperature. The chain of chemical events which follows leads to a crosslinked coating. The advantage of this system is that it uses oxygen as an active agent in the crosslinking chemistry via a free-radical mechanism; thus, the coating formulation is stable until it is exposed to oxygen. Its obvious disadvantage is that organic solvents are liberated as the coating dries. Recent examples of water dispersible alkyds are described in U.S. Pat. No. 5,378,757, and references cited therein and PCT application WO 95/02019, as well as U.S. Pat. No. 4,251,406. In addition, as commercial alkyd coatings age, they have a tendency to become brittle and yellow.

In addition to alkyds, unsaturated polyesters are another class of resins which are prepared from the esterification of unsaturated dicarboxylic acids, and polyols. The unsaturated moiety of the polymer is usually located in the backbone of the polymer molecule. Although unsaturated polyesters can be oil-in-water emulsions, water-in-oil emulsions of unsaturated polyesters are typical. U.S. Pat. No. 3,629,169 describes a curable water-in-oil emulsion in which the oil phase contained a carboxylic acid-containing unsaturated polyester, a copolymerizable monomer such as styrene or methacrylic ester, non-ionic emulsifiers, a thixotropic thickener, a basic neutralizing agent, a promoter-catalyst system composed of dimethyl aniline, an oil soluble cobalt salt, and a thermal peroxide initiator. An emulsion was obtained by adding water while the oil phase was being stirred.

U.S. Pat. No. 3,950,287 describes a process for converting polymerizable water-in-oil emulsions to thermoset objects at room temperature. The oil phase consists of a carboxylic acid-containing unsaturated polyester resin, polymerizable monomers, oil-soluble cobalt salts, and a promoter consisting of N-hydroxyl alkyl substituted, phenyl-substituted tertiary amines and dialkyl anilines. The water phase, which contains hydrogen peroxide, is stirred into the oil to obtain an emulsion which rapidly cures. This reference claims that the effectiveness of a combination of catalyst and promoter is enhanced when it includes a mixture of tertiary amines where one of the tertiary amines has a hydroxyalkyl group attached to the amino group of the nitrogen, and the second amine is a dialkyl aniline. It is claimed that the -OH group of hydroxyalkyl substituted amines coordinates with cobalt which enhances the effectiveness of the catalyst-promotor system in affecting rapid gelation of the emulsion. The emulsions in the above inventions are claimed to be useful for preparing shaped objects.

U.S. Pat. No. 4,077,931 describes a process for producing a pourable (or pumpable) thermosetting water-in-oil emulsion comprising water as the continuous phase, and an unsaturated polyester, copolymerizable monomer, and a peroxide-cobalt-tertiary amine curing system in the oil phase. This reference teaches that unsaturated polyesters with molecular weights greater than 1800 g/mole give water-in-oil emulsions with superior properties. This reference describes a formulation recipe which allowed the emulsion to be shaped into usable objects before substantial cure of the emulsion occurred. Thus, this reference explored the use of water-in-oil emulsion prepared from unsaturated esters as molding compounds for shaped objects.

An approach to an emulsion particle which has dangling double bonds, which avoids the problem of polymerization of such double bonds during emulsion polymer synthesis is to first carry out a synthesis providing a latex particle with acid, epoxy, or carbodiimide functionality which is followed by reaction with an epoxy or acid functional compound, respectively, which contains a double bond.

U.S. Pat. No. 4,244,850 describes air drying and air curable latex coating compositions that have unsaturated resin particles dispersed in the water phase and which are combined with an emulsion of a drier salt. The coating compositions were formed by first preparing a latex whose particles contain either carboxyl or 1,2-epoxide functionality. After formation of the latex, a portion of the reactive carboxyl or 1,2-epoxide functionality was reacted with an ethlenically unsaturated monomer carrying one of the other of said reactive groups to provide unsaturated groups on the latex particles. For example, if the initial latex is made with free carboxylic acid functionality, it is then later reacted with methacrylic acid to leave free ethylenic unsaturation on the surface of the modified latex particle. The emulsion of a drier salt is then added after the post reaction. Drier salts such as cobalt naphthanate are used to facilitate the air curing of the residual acrylate moiety. Interestingly, no analytical data is given to support the claims. Instead, only broad observations of cast films are given. For example, the patent states that "water resistance, hardness and adhesion were observed, and it was seen that these gradually improved to possess the properties of cured alkyd coatings." No controls were performed.

U.S. Pat. No. 4,033,920 describes an acrylic dispersion polymer which contained dangling methacrylate double bonds. In the process described in this reference, glycidyl methacrylate was reacted with carboxylic acid-containing polymers in solution. The solvent was removed under reduced pressure and replaced by a polymerizable monomer. The polymer solutions were neutralized with ammonia, diethanolamine, or triethyl amine, then dispersed into water to form an emulsion. This reference suggests that the oil phase of the emulsion could contain conventional initiators such as benzoyl peroxide, and azobisisobutyronitrile. For photocure, photosensitizers such as benzoin (only one example was demonstrated), benzoin methyl ether, and the like were suggested. This reference was directed to the use of these emulsions for preparing films which cured by ultraviolet light or electron beam.

A second approach is to react carboxylic acid-containing latex particles with carbodiimide methacrylates to produce latex particles with dangling methacrylates (see U.S. Pat. No. 5,371,148.)

U.S. Pat. No. 3,219,610, teaches that emulsion particles prepared from allyl methacrylate, ethyl acrylate, and methyl methacrylate produced acetone insoluble films when they were baked at 150° C. for 30 minutes; whereas, films which were air dried for two hours were soluble in acetone. No analysis of the allyl content of these films were made to determine the amounts if any, of allyl moieties which survived the emulsion polymerization process. No styrene was used in this process, and no morphology design of the latex particles was attempted. No methyl ethyl ketone (solvent) resistance data was given.

GB Patent No. 2206591A taught the use of allyl methacrylate to prepare seed/shell/mantle latexes where the shell (as used below, the seed/shell would be referred to as the core) was crosslinked with allyl methacrylate. More recently, Lee and Rudin (Makromol. Chem., Rapid Commun. 10, 655 (1989)) used 5 weight percent of allyl methacrylate in the core of core/shell latex particles as a "crosslinking agent" to give the core gel fraction. U.S. Pat. No. 4,925,893 and European Patent Application 0 297 781 A2 teach the preparation of latexes using a combination of allyl methacrylate and diallyl phthalate with other polymerizable monomers to prepare coatings which cured ambiently in the presence of catalyst. Styrene is disclosed as a possible but not preferred monomer.

U.S. Pat. No. 5,264,482 teaches the reaction of allyl glycidyl ether with carboxylic acid-containing copolymers to produce a water-soluble polymer with a "dangling allyl ether group" which was used as a curative additive to latex paints to increase lap time (or improve wet edge).

U.S. Pat. Nos. 5,002,998 and 5,364,891 describe the preparation of polymers having chain-pendant amine groups and certain selected non-polymeric ketone-containing compounds such as acetoacetates and acetoacetamides which react to form enamines.

Although there is a need for products such as those described above, there is a further need for advanced products that have improved, lower initial molecular weight characteristics, improved adhesion, and products that will crosslink under ambient conditions or low to moderate temperatures in the presence of air with or without the use of drier salts or fugitive filming aids.

BRIEF DESCRIPTIONS OF THE DRAWINGS

Figure 3:
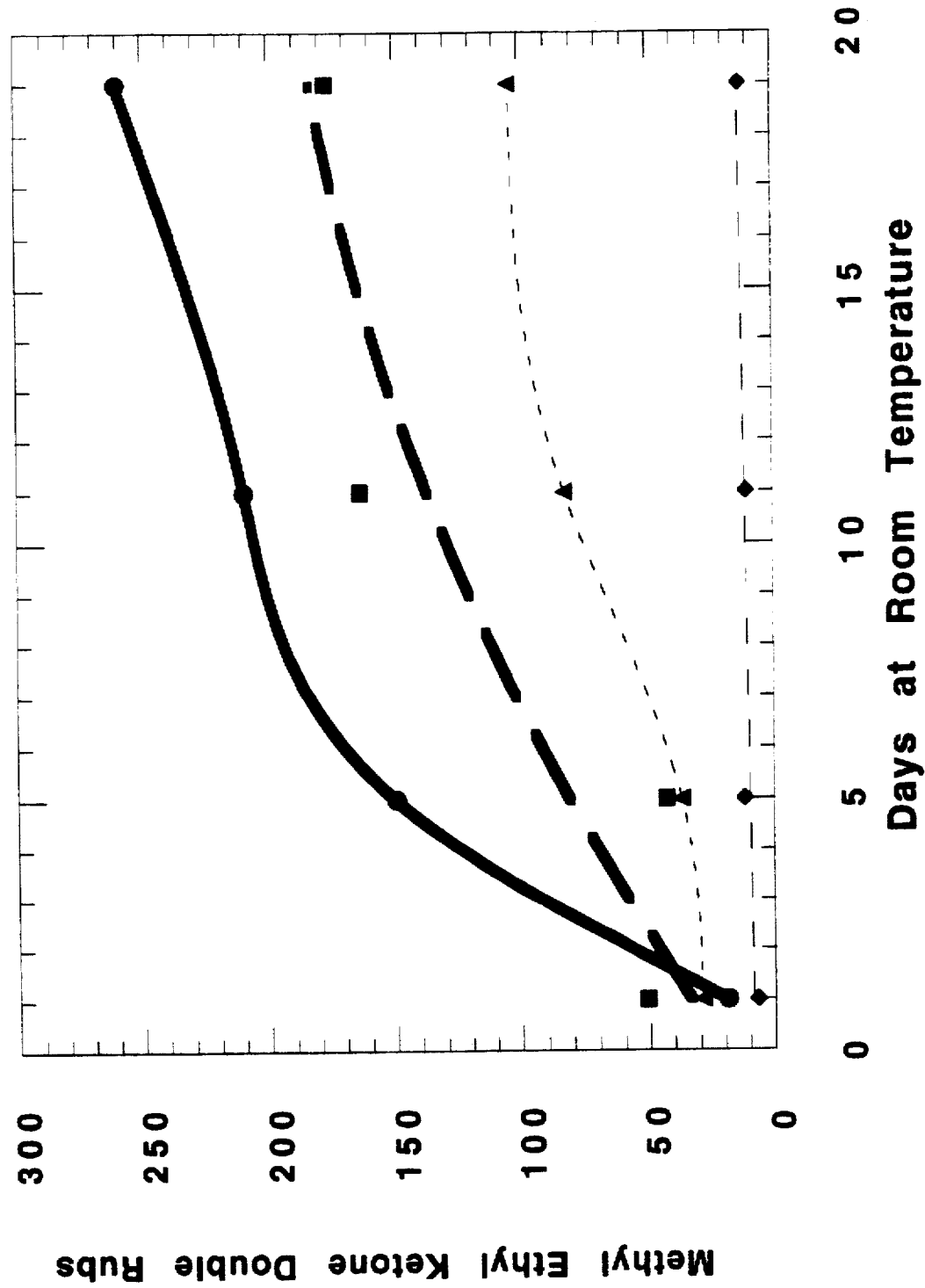

FIG. 3 is a plot of methyl ethyl ketone double rubs versus days at room temperature. The films tested were prepared from the latex of Example 6 with varying amounts of cobalt catalyst, and the commercially available latexes, Rohm & Haas Co. RHOPLEX E2950 and HYDUR 30. The diamond points are for HYDUR 30, the triangle points are for RHOPLEX E2950, the square points are for the formulated latexes of Example 7 (with 11.82 g (5 phr)) of AQUACAT Cobalt catalyst, and the circular points are for the formulated latexes of Example 7 (with 5.91 g (2.5 phr)) of AQUACAT Cobalt catalyst (phr is the amount in grams of material per one hundred grams of dry resin).

SUMMARY OF THE INVENTION

The present invention provides polymers having pendant enamine functionality, wherein said enamine groups are attached to the polymer via a nitrogen atom; preferably, the pendant groups also possess ethylenic unsaturation, preferably in the form of (meth)acrylate groups and additionally possess free allyl functionality. The term (meth)acrylate is used herein to describe either acrylate or methacrylate groups. The presence of these groups in the polymer allows for a free-radical crosslinking reaction to take place during film formation in the presence of oxygen or other free radical sources and provides coatings having superior solvent resistance. Amino-containing waterborne particles were prepared by reacting propylene imine with carboxylic acid-containing latexes. The amino-functionalized latexes were then subsequently reacted at 25°–60° C. with acetoacetoxyethyl methacrylate (AAEM). During ambient and thermal cure studies, clear films exhibited significant increases in solvent resistance, gel fraction, and crosslink density.

DETAILED DESCRIPTION OF THE INVENTION

The present invention provides an allyl-functional polymer having one or more pendant side chains connected thereto, wherein said pendant side chains contain an enamine group, wherein said enamine group is bonded to said polymer via a nitrogen atom. Preferably, the pendant side chain will also contain ethylenic unsaturation in addition to the enamine group. In a further preferred embodiment, the polymer will also have pendant allyl functionality.

In a preferred embodiment, the present invention provides a polymer having the formula

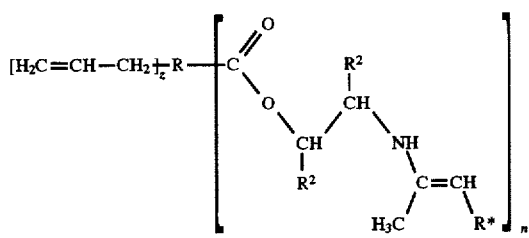

wherein R is a polyvalent group having a number average molecular weight of about 2500 to 1,000,000, n is an integer of from about 2 to 100, Z is an integer of from about 2 to 500, $R^2$ is independently hydrogen or methyl, and $R^*$ is a $C_1$–$C_{20}$ hydrocarbyl radical. In this formula, the enamine portion is preferably derived from a compound having an acetoacetyl group, for example, a $C_1$–$C_8$ alkyl acetoacetate or a compound of Formula (1) as shown below. Thus, the $R^*$ group is the residue remaining after the acetoacetyl group has reacted with an amine group on the polymer.

Thus, in a further preferred embodiment of the present invention, there is provided a polymer having the formula

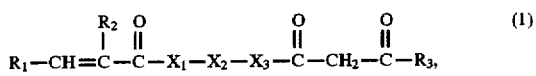

$$R_1-CH=C-C-X_1-X_2-X_3-C-CH_2-C-R_3, \quad (1)$$

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ straight or branched chain alkylene or $C_3$–$C_{12}$ cycloalkylene.

As noted above, the pendant groups of the present invention allow for a free radical crosslinking reaction to take place when the polymers are applied to a substrate and exposed to oxygen. In a preferred embodiment of this aspect of the invention, there is provided the above particle, wherein said particle possesses sufficient pendant ethylenic unsaturation to crosslink when exposed to a free-radical flux.

As noted above, the polymers will also possess pendant allyl functionality. The terms "allyl functionality" and "allyl group" both refer to a group having an allylic hydrogen atom, wherein said group is bonded to a moiety which is other than a carbonyl group. Such pendant allyl functionality can be introduced using the methodology described in copending application U.S. Ser. No. 08/420,550, filed Apr. 12, 1995, incorporated herein by reference. In general, it is possible to introduce pendant allyl groups, particularly on the shell of a core/shell polymer particle by copolymerizing an allyl group-containing ethylenically unsaturated monomer such as allyl methacrylate, hydroxybutenyl methacrylate, allyl mercaptopropionate, and the diallyl ester

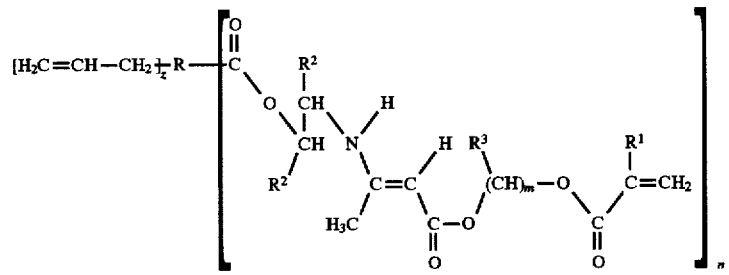

wherein R is a polyvalent group having a number average molecular weight of about 2500 to 1,000,000, n is an integer of from about 2 to 100, m is an integer of about 2 to 5, Z is an integer of from about 2 to 500, $R^1$ is hydrogen or $C_1$–$C_6$ alkyl, $R^2$ is independently hydrogen or methyl, and $R^3$ is hydrogen or $C_1$–$C_6$ alkyl. Preferably, the polymer residue "R" is a polymer prepared by the free radical polymerization of ethylenically unsaturated compounds.

The polymers of the present invention are capable of crosslinking at temperatures of as low as about 5° C. In the above formula, it is preferred that $R^1$ is methyl and one of $R^2$ is hydrogen and the other of $R^2$ is methyl, and $R^3$ is hydrogen, and m is 2.

In the polymers of the present invention, it is preferred that the polymers are prepared using emulsion polymerization techniques using ethylenically unsaturated monomers.

Such emulsions provide the polymers of the present invention in the form of particles of the polymers dispersed in water. Accordingly, in a further preferred embodiment of the present invention, there is provided a polymeric particle having a mean diameter of about 35 to 350 nm, said particle comprising the reaction product of an amine-functional polymer having free allyl functionality and a compound of Formula (1)

of maleic acid, in the presence of a styrenic monomer such as styrene, alpha-methylstyrene, vinyl napthalene and the like, or in the presence of an alkyl (alkyl)acrylate such as methyl methacrylate. An allyl group-containing ethylenically unsaturated monomer is a compound having at least one allyl group and at least one other ethylenically unsaturated group other than an allyl, or a group which is capable of a free-radical reaction, or wherein said monomer is a compound having three or more allyl groups.

The above particles can exist in many morphologies, including a generally spherical or roundish particle, a peanut-shell shape, a raspberry shape, an acorn shape, a multilobe shape, or an "O"-shape.

In a further preferred embodiment of the present invention, there is provided a generally spherical polymeric particle having a core portion and a shell portion, wherein said core portion is a polymer composition comprising the reaction product of the free-radical emulsion polymerization of ethylenically unsaturated monomers, and wherein said shell portion is a polymer having free allyl functionality and one or more pendant side chains connected thereto, wherein said pendant side chains contain ethylenic unsaturation and are connected to said polymer via an enamine group, wherein said enamine group is bonded to said polymer via a nitrogen atom, wherein said particle having an overall $T_g$ of about −50° C. to about 50° C.

In a preferred embodiment, the above particle has an overall $T_g$ of about −5° C. to 30° C. The core of said particle preferably has a $T_g$ of about −50° C. to about 40° C. and the shell of said particle has a T of about −15° to 50° C. In a further preferred embodiment, the core of said particle has a $T_g$ of about −15° C. to about 30° C. and the shell of said particle has a $T_g$ of about −5° C. to 40° C. The core portion preferably is comprised of about 20 to about 80 percent of the total weight of said particle and said shell portion comprises about 80 to about 20 percent of the total weight. Preferably, said particle has an overall gel fraction of about 5 to about 90 percent. In a further preferred embodiment, the core has an overall gel fraction of about 60 to about 99 percent. Gel fraction is determined using the method described in the experimental section below.

We have discovered that "dangling" or pendant polymerizable methacrylate double bonds and enamine groups can easily be placed on the surface of amino-containing latex particles at room temperature using a compound of Formula (1) above, such as acetoacetoxyethyl methacrylate (AAEM). The polymers of the present invention can be prepared as follows: prepare latex particles with carboxylic acid groups, then treat these groups using propylene imine. This reaction is shown below:

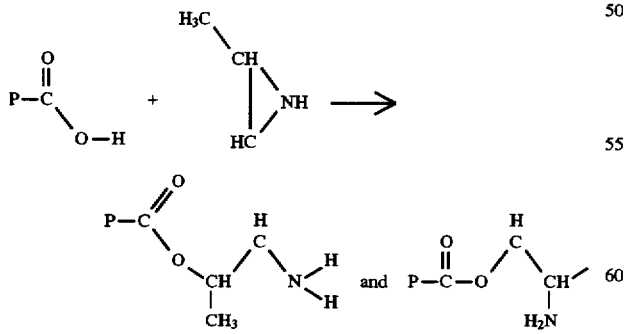

Preparation of the reactive waterborne polymers can then be accomplished by stirring an emulsion of a compound with a structure shown in Formula (1), for example, acetoacetoxyethyl methacrylate (AAEM), into the amino-containing latex. The ketone functionality of the compound of Formula 1 reacts with the amine groups to produce a polymer with dangling methacrylate double bonds and enamine functionality. The reaction is shown below:

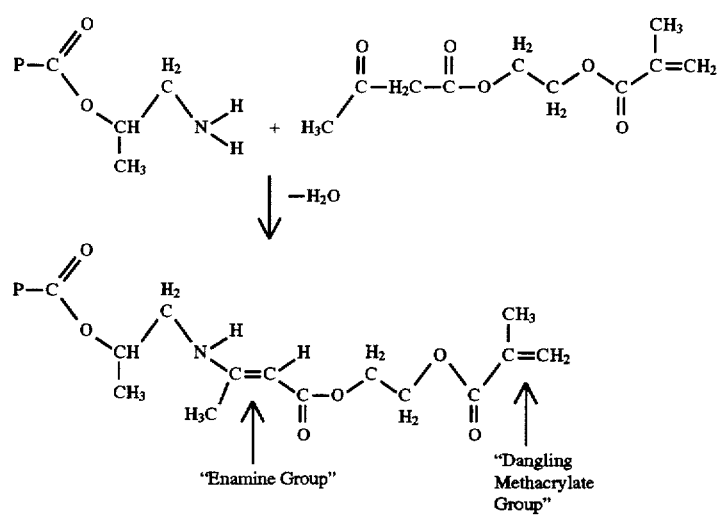

In addition, the enamine-forming reaction was also shown to occur rapidly with t-butyl acetoacetate.

In a further preferred embodiment of the present invention, the polymers may further contain pendant acetoacetyl functionality, wherein said acetoacetyl functionality may be stabilized by reaction with ammonia or a primary or secondary amine to form an enamine group. Such groups may be introduced onto the surface of the polymer by first preparing an allyl functional polymer having pendant acetoacetyl and carboxyl functionality. This polymer can then be treated with ammonia or a primary or secondary amine to form pendant enamine-stabilized acetoacetyl groups and the pH adjusted (i.e., lowered) to provide free carboxyl groups. The resulting polymer can then be treated with a compound such as propylene imine to provide free amine groups, which in turn can be reacted with a compound of Formula (1) to provide a polymer having both pendant enamine-stabilized acetoacetyl groups as well as the pendant groups of the present invention.

In the above polymers, additional ethylenically unsaturated species which can be utilized include, for example, methyl acrylate, methyl methacrylate, ethyl acrylate, ethyl methacrylate, butyl acrylate, butyl methacrylate, isobutyl acrylate, isobutyl methacrylate, 2-ethylhexyl acrylate, 2-ethylhexyl methacrylate, octyl acrylate, octyl methacrylate, styrene, α-methyl styrene, alkyl crotonates, alkenyl crotonate, vinyl acetate, dioctyl maleate, di-n-butyl maleate, and compounds of the general formula (3)

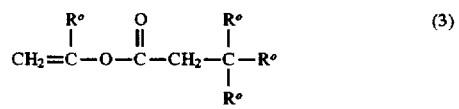

wherein R° is independently hydrogen or an alkyl group of up to 12 carbon atoms. Preferably, at least one of R° is methyl.

Preferred compounds of formula (3) include the following:

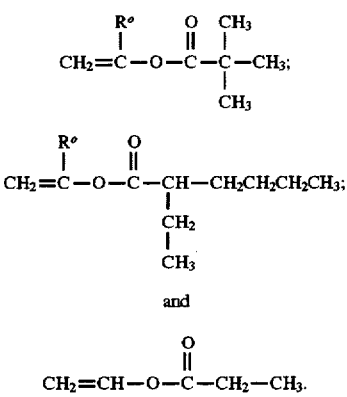

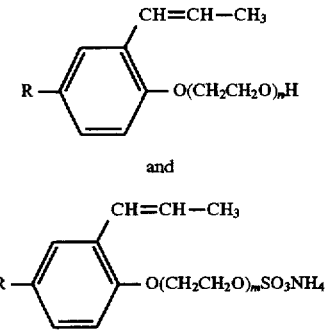

wherein R is nonyl or octyl and n and m are integers of from 1 to 50 and 1 to 10, respectively. Other reactive surfactants include the sodium alkyl allyl sulfosuccinate sold by Henkel, under the mark TREM LF-40. Further examples of such surfactants can be found in U.S. Pat. Nos. 5,185,212; 2,600,831; 2,271,622; 2,271,623; 2,275,727; 2,787,604; 2,816,920; and 2,739,891, incorporated herein by reference.

Water-dispersible and water-soluble polymers may also be employed as surfactants/stabilizers in the emulsion polymerizations described herein. Examples of such polymeric stabilizers include water-dispersible polyesters (U.S. Pat. Nos. 4,946,932 and 4,939,233, incorporated herein by reference) and water-dispersible polyurethanes (U.S. Pat. Nos. 4,927,876 and 5,137,961, incorporated herein by reference).

In the above emulsions, the polymer preferably exists as a generally spherical particle, dispersed in water.

As a further aspect of the present invention there is provided a latex composition as described above, further comprising one or more leveling, rheology, and flow control agents such as silicones, fluorocarbons or cellulosics; neutralized carboxylic acid-containing latex particles with highly crosslinked particles; associative thickeners; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include synthetic silica, available from the Davison Chemical Division of W.R. Grace & Company under the trademark SYLOID®; polypropylene, available from Hercules Inc., under the trademark HERCOFLAT®; synthetic silicate, available from J.M. Huber Corporation under the tradename ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium It is also preferred that in this process, a chain transfer agent is utilized in a range of about 0.01% to 8% by weight, based on the total solids in the emulsion. Exemplary chain transfer agents are butyl mercaptan, mercaptopropionic acid, 2-ethylhexyl 3-mercaptopropionate, octyl mercaptan, isodecyl mercaptan, octadecyl mercaptan, and the reactive chain transfer agents taught in U.S. Pat. No. 5,247,040, incorporated herein by reference, in particular allyl mercaptopropionate, allyl mercaptoacetate, crotyl mercaptopropionate, and crotyl mercaptoacetate.

In the above process, suitable initiators, reducing agents, catalysts and surfactants are well-known in the art of emulsion polymerization. Typical initiators include hydrogen peroxide, potassium or ammonium peroxydisulfate, dibenzoyl peroxide, lauryl peroxide, ditertiary butyl peroixide, 2,2'-azobisisobutyronitrile, t-butylperoxide, t-butyl hydroperoxide, benzoyl peroxide, sodium formaldehyde sulfoxylate and the like. Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above described reducing agents, promote decomposition of the polymerization initiator under the reaction conditions.

Suitable catalysts include transition metal compounds such as, for example, ferrous sulfate heptahydrate, ferrous chloride, cupric sulfate, cupric chloride, cobalt acetate, cobaltous sulfate, and mixtures thereof.

Suitable surfactants include ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta-and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

Also, reactive anionic or nonionic surfactants possessing free radically polymerizable groups may be utilized. Examples include surface active monomers sold by PPG Industries, Inc., as MAZON SAM 181, 183, 184, 211 which are anionic sulfates or sulfonates and MAZON SAM 185–187 which are nonionic. Other reactive surfactants include those sold by Daiichi Kogyo Seiyaku under the N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners includes the methane/ethylene oxide associative thickeners and water soluble carboxylated thickeners, for example, those sold under the UCAR POLYPHOBE trademark by Union Carbide.

Several proprietary antifoaming agents are commercially available,for example, under the tradename Brubreak of Buckman Laboratories Inc., under the BYK® trademark of BYK Chemie, U.S.A., under the FOAMASTER® and NOPCO® trademarks of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademarks of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyano-methylthio) benzothiazole, potassium dimethyl dithiocarbamate, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamide Company under the trademark CYASORB UV, and diethyl-3-acetyl-4-hydroxybenzyl-phosphonate, 4-dodecyloxy-2-hydroxy benzophenone, and resorcinol monobenzoate.

Such paint or coating additives as described above form a relatively minor proportion of the coating composition, preferably about 0.05 weight % to about 5.00 weight %.

As a further aspect of the present invention, there is provided a coating composition optionally containing one or more of the above-described additives. It may also be desirable to utilize a water-miscible organic solvent and/or coalescing agent. Such solvents and coalescing agents are well known and include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, TEXANOL ester alcohol, and the like. Such solvents and coalescing aids may also include reactive solvents and coalescing aids such as diallyl phthalate, SANTOLINK XI-100 polyglycidyl allyl ether from Monsanto, and others as described in U.S. Pat. Nos. 5,349,026 and 5,371,148, incorporated herein by reference.

(See, for example, J. K. Backus in "High Polymers, Vol. 29, 1977, p. 642–680).

As a further aspect of the present invention, there is provided a waterborne coating composition as set forth above, further comprising one or more pigments and/or fillers in a concentration of about 1 to about 70 weight percent, preferably about 30 to about 60 weight percent, based on the total weight of components of the composition.

Pigments suitable for use in the coating compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

In the experimental section below, clear films were prepared from polymers containing the enamine and methacrylate functionality. Films placed in a forced-air oven for 30 minutes crosslinked effectively at temperatures greater than 100° C. and latexes formulated with cobalt driers formed films which crosslinked effectively at room temperature (Examples 2 and 3, 7, 12, 14 and 18). Latexes modified with t-butylacetoacetate were also shown to cure at 140° C. (Example 8). The reaction of propylene imine with carboxylic acid-containing latexes is thought to produce primary amines attached to primary carbons and secondary carbons; however, latexes containing amines attached to tertiary carbons may also be used.

Although these reactive polymers were formulated with cosolvents, diluents, reactive plasticizers (such as diethylene glycol dimethacrylate, pentaerythritol triacrylate, pentaerythritol tetraacrylate, trimethyolpropane triacrylate, divinyl adipate, or diisopropenyl adipate) could also have been used. In addition, other nonreactive filming aids such as alcohols, hydroxy-ethers, esters, esters of lactic acid or ketones could also be used. The above plasticizers could also be used in combination with hydrocarbon solvents or supercritical carbon dioxide.

Further, one can include the reactive film-forming aids taught by U.S. Pat. No. 5,349,026, incorporated herein by reference.

In a further preferred embodiment, the latexes contain drier salts. Drier salts are inorganic metal compounds that are based on metals such as cobalt, manganese, or zirconium which may have as an anion such as the conjugate base of an organic acid (i.e. 2-ethylhexanoate) for dispersibility into water. Further details regarding the use of additives to emulsion polymer compositions can be found in U.S. Pat. No. 5,371,148, incorporated herein by reference.

Examples show the preparation of reactive crosslinkable film-forming styrene-acrylic latexes, film-forming acrylonitrile-containing latexes and their performance property enhancements resulting from their crosslinking ability in formulated coatings. In addition, the use of vinyl acetate or vinyl ester-based monomers or blends prepared from vinyl acetate-based latexes are possible. Polymers functionalized using the above technology can be applied to a substrate directly from water, or if desirable, they could be isolated as powders. Applications include (but are not limited to) coatings for metal, paper (e.g., inks), gypsum board, plaster, plastic, wood, concrete, masonry, and textiles. Thus, as a further aspect of the present invention, there is provided an article which has been coated with a coating composition of the present invention and dried.

The polymers of the present invention can be used alone or in conjunction with other polymers to achieve the desired physical properties of, for example, a decorative or protective coating. Accordingly, as a further aspect of the present invention, there is provided a polymer composition comprising a blend of the polymers of the present invention, blended with a water-dispersible polymer selected from the group consisting of alkyds, polyesters, polyester-amides, cellulose esters, polyurethanes, polyethers, acrylics, and vinyl polymers.

EXPERIMENTAL SECTION

Raw Materials

AEROSOL-OT, sodium dioctyl sulfosuccinate, is an anionic surfactant sold by Cytec Industries, Inc.

AEROSOL 18, N-octadecyl sulfonsuccinamate, is an anionic surfactant solid by Cytec Industries, Inc.

TERGITOL NP-40 (70% in water) and Tergitol NP-4 are nonyl phenol-based nonionic surfactants sold by Union Carbide Corporation.

TREM LF-40 (40% solids) is sodium dodecyl allyl sulfosuccinate, an anionic reactive surfactant sold by Henkel.

Hydrosulfite AWC (100% solids) is sodium formaldehyde sulfoxylate, a redox initiator sold by Henkel 2-Acrylamido-2-methylpropanesulfonate, sodium salt (AMPS, 50% solids in water) sold by Lubrizol Corp., Wichleffed, Ohio 44092

Allyl methacrylate, was purchased from ROHM TECH INC., 195 Canal St., Malden, Mass. 02148

Methyl methacrylate, styrene, n-butyl acrylate, ethyl acrylate, 2-ethylhexyl acrylate, sodium persulfate, sodium metabisulfite, and t-butylhydro-peroxide were purchased from Aldrich.

Trimethylolpropane triacrylate (TMPTA), a tri-functional acrylate was purchased from Polysciences.

Pentaerythritol triacrylate and pentaerythritol tetraacrylate were purchased from Polysciences Acetoacetoxyethyl Methacrylate (AAEM) is a monomer sold by Eastman Chemical Company.

Tert-Butyl Acetoacetate is a monomer sold by Eastman Chemical Company.

2-Ethylhexyl 3-Mercaptopropionate, a mercaptan monomer was purchased from Phillips Petroleum.

AQUACAT (Alkylaryl ethoxlate of cobalt; 5% active cobalt metal, 72% Solids), was purchased from ULTRA ADDITIVES, Inc., 460 Straight St., Paterson, N.J. 07501.

SURFYNOL 104 and 104DPM (50% Solids), were purchased from Air Products and Chemicals, Inc., 7201 Hamilton Boulevard, Allentown, Pa. 18195-1501.

TAMOL 1124 is a dispersant sold by Rohm & Haas Company.

TRITON CF-10 is a surfactant sold by Union Carbide.

FOAMASTER AP and FOAMASTER VF are defoamers sold by Henkel.

Ethylene glycol can be purchased from Aldrich Chemical Company.

TIPURE R-900 is a titanium dioxide pigment sold by DuPont.

ACRYSOL RM-5 is a rheology modifier sold by Rohm & Haas Company.

CELLOSIZE 4400H is a rheology modifier sold by Union Carbide.

HYDROCURE II is a cobalt drier sold by Mooney Chemicals, Inc.

Testing Procedures

MFFT resist

Resistant minimum film forming temperature (MFFT resist) is determined by casting a wet latex film with a 4-mil applicator cube on an MFFT bar set at a temperature range in which the film will coalesce during drying, pulling the edge of a brass spatula blade through the film from cold to hot end on the MFFT bar after 30 minutes, and recording the temperature at which the blade offers significant resistance.

Methyl Ethyl Ketone Resistance

Films were constantly soaked with methyl ethyl ketone. Data was obtained using a crockmeter with a 1 kg weight placed on the arm for a total weight of approximately 1500 g. The test ended when the breakthrough of the film on the panel was first observed. Data were reported as double rubs (one set of back and forth). All data are an average of three results.

Constant Temperature and Humidity Room:

Films were prepared and film measurements were conducted at ASTM standard conditions for laboratory testing of 73.5+/−3.5° F. (23+/−2° C.) and 50+/−5% relative humidity.

Film Gel Fraction (FGF) and Film Swell Ratio (FSR):

Film gel fraction (FGF) is obtained by determining the insoluble weight fraction of polymer in a dry film sample. Film swell ratio (FSR) is obtained by determining the ratio of the insoluble polymer weight fraction swollen in the selected solvent to dry weight of the insoluble weight fraction in a dry film sample. Average values are determined from quadruplicate measurements with acetone as the solvent.

The procedure used is as follows: for each sample determination, a 4"×4" 325-mesh steel screen and a metal weighing boat are baked in a vacuum oven at 120° C. for 90 minutes, cooled 30 minutes over $P_2O_5$ and weighed (W1 and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnite and then in a vacuum oven at 120° C. for 3 hours and cooled for 30 minutes in a dessicator over $P_2O_5$. The samples are weighed and the vacuum portion of the baking procedure is repeated until reproducible weights are obtained for the screen plus dry solids (W6) and the film sample in the aluminum boat (W7). Calculations are shown below:

$$FGF=(W6-W1)/(W4)*(W7-W2)/W3))$$

$$FSR=(W5-W1)/(W6-W1)$$

Paint Viscosity:

Paint viscosity (in KU units) was measured after 24 hours using a Krebs-Stormer viscometer.

Gloss:

Gloss was measured on 6 mil (wet) thick films cast on Leneta 2B opacity paper after 24 hours using a micro-triglossmeter by BYK-Gardner according to ASTM method D 523 Test Method for Specular Gloss.

Blocking Resistance:

Blocking resistance was determined using 6 mil (wet) films on Leneta 2B opacity paper according to ASTM 4946

Test Method for Blocking Resistance of Architectural Paints using 1 psi pressure after film dried to designated times. The tests were numerically rated where a 1 represents 100% pass where painted surfaces pulled apart with no noise, a 2 represents noise when painted surfaces are separated but no film degradation, a 3 represents some destruction of the painted surfaces when the two surfaces are separated and a 4 represents 100% fail where the painted surfaces flow completely together and complete destruction of the films occurs upon separation.

Print Resistance:

Print resistance was determined using 6 mil (wet) films on Leneta 2B opacity paper according to ASTM D 2064-91 Test Method for Print Resistance of Architectural Paints using a 4 pound weight placed on top of a #9 black rubber stopper which was placed on four layers of cheesecloth after film dried to designated times. The tests were numerically rated where a rating of 1 represents 100% pass with no demarcation (cloth lifts off with no print left behind), a rating of 2 represents demarcations in the coating, and a ratio of 3 represents 100% fail (the cheesecloth impregnates the film).

EXAMPLE 1

Preparation of a Allyl Group-Containing Latex Modified with Propylene Imine Followed by Acetoacetoxyethyl Methacrylate To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 43.49 g of methyl methacrylate, 17.57 g of styrene, 48.44 g of 2-ethylhexyl acrylate, 0.336 g of trimethylolpropane triacrylate, and 6.712 g of acetoacetoxyethyl methacrylate. A nitrogen purge was begun, then the contents of the reactor brought up to 80° C. at 400 rpm. After reaching 80° C., an initiator charge composed of 7.70 g of sodium persulfate dissolved in 43.6 g of water were added to the reactor. An emulsion feed composed of 355 g of water, 13.01 g of TREM LF-40, 10.21 g of TERGITOL NP-40 (70%), 267.13 g of methyl methacrylate, 107.93 g of styrene, 297.55 g of 2-ethylhexyl acrylate, and 2.06 g of trimethylolpropane triacrylate was fed into the reactor at 8.375 g/min. Five minutes after the first emulsion feed was begun, an initial solution composed of 4.36 g of sodium persulfate dissolved in 112 g of water was fed in at 0.536 g/min. After the first emulsion feed was completed, a second emulsion feed composed of 171 g of water, 12.79 g of Aerosol 18, 5.09 g of TERGITOL NP-40 (70%), 114.36 g of styrene, 192.5 g of 2-ethylhexyl acrylate, 59.97 g of methacrylic acid, and 47.97 g of allyl methacrylate was fed into the reactor at 8.375 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The reactor was cooled to 60° C., then 38.05 g of propylene imine dissolved in 64.8 g of water was pumped in a 3.4 g per minute. After the propylene imine feed was finished, the reactor was heated at 60° C. for 2 hours. An emulsion prepared by stirring 132.2 g of acetoacetoxyethyl methacrylate, 1.97 g of TERGITOL NP-6, and 0.14 g of AEROSOL OT into 147.4 g of water which contained 1.97 g of TERGITOL NP-40 (70%). The acetoacetoxyethyl methacrylate emulsion was pumped into the amino-containing latex at 9.26 g per minutes, then held at 60° C. for 2 hours. The emulsion was cooled then filtered through 100 mesh wire screen. Solids level, 46.58%, pH, 7.3; surface tension, 39.2 dynes/cm; particle size, 232 nm; amount of dried material (100 mesh screen), 2.0 g; viscosity (Brookfield, LVT #1 spindle, 60 rpm), 31.0 cps. Infrared analysis of clear films cast over zinc selenide showed an absorption at 1655 cm$^{-1}$ which represents an enamine moiety, and an absorption at 1638 cm$^{-1}$ which represents a methacrylate double bond moiety.

EXAMPLE 2

Preliminary Solvent Resistance Studies of Clear Films from Example 1

To 25 g of the latex prepared in Example 1 were added with stirring 0.59 g of TEXANOL (5 phr) and 0.12 g of cobalt AQUACAT drier (5% active on cobalt). The formulated emulsion was then stirred for 15 minutes, and 6 mil films (wet) drawn over ACT polished cold rolled steel panels (3"×9"×0.032"). The films were cured at room temperature or a forced-air oven under the conditions described below:

| Cure Temp. | Cure Time | MEK Double Rubs (no drier) | MEK Double Rubs (with drier) |
|---|---|---|---|
| Room Temp. | 3 Days | 30 | 120 |
| 100° C. | 30 min. | 40 | 80 |
| 120° C. | 30 min. | 80 | 160 |
| 140° C. | 30 min. | 305 | 420 |

EXAMPLE 3

Solvent Resistance Studies of Clear Films Cured at Room Temperature Using the Latex from Example 1

Figure 1:
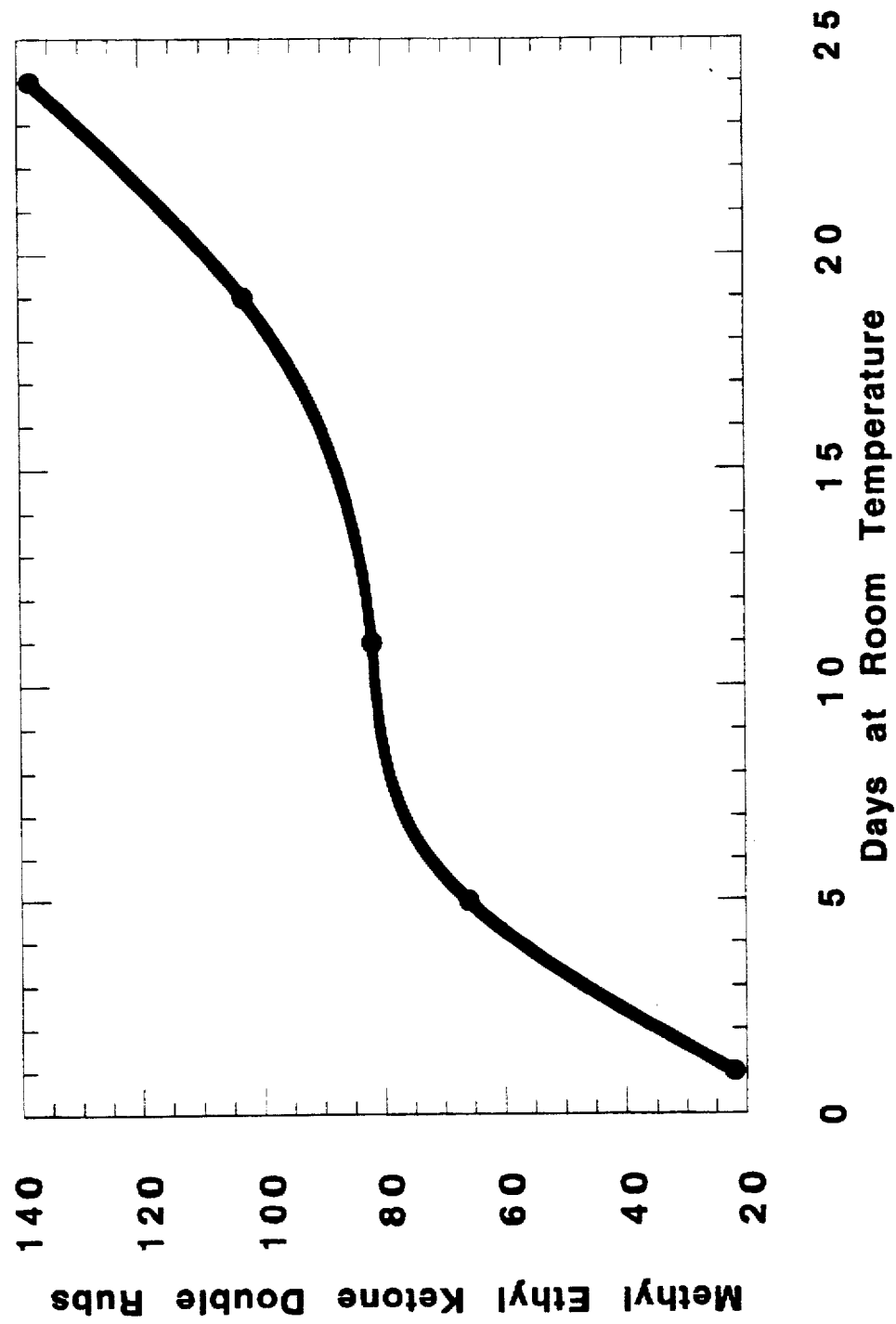
FIG. 1 is a plot of methyl ethyl ketone double rubs versus days at room temperature. This data shows the solvent resistance of clear films prepared using the formulated latex from Example 3 below.

To 25 g of the latex prepared in Example 4 were added with stirring 5.91 g of cobalt AQUACAT drier (5% active on cobalt). The formulated emulsion was then stirred for 15 minutes, and 6 mil films (wet) drawn over ACT polished cold rolled steel panels (3"×9"×0.032"). The films were cured at room temperature as shown in FIG. 1.

EXAMPLE 4

Preparation of an Allyl Group-Containing Latex Modified with Propylene Imine Followed by Acetoacetoxyethyl Methacrylate To a 3000 mL resin kettle equipped with a condenser, nitrogen purge, and subsurface feed tube were added 640 g of water, 4.05 g of TREM LF-40, 1.93 g of TERGITOL NP-40 (70%), 7.3 g of sodium carbonate, 43.49 g of methyl methacrylate, 18.67 g of styrene, 47.33 g of 2-ethylhexyl acrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 13.01 g of TREM LF-40, 10.21 g of TERGITOL NP-40 (70%), 267.13 g of methyl methacrylate, 114.72 g of styrene, 290.76 g of 2-ethylhexyl acrylate, and 2.06 g of trimethylolpropane triacrylate was begun. Five minutes after the first emulsion feed was fed into the reactor at 8.375 g/min, an initiator solution of 4.36 g of sodium persulfate dissolved in 112 g of water was fed in at 0.536 g/min. After the first emulsion feed was completed, a second emulsion feed composed of 171 g of water, 12.79 g of AEROSOL 18, 5.09 g of TERGITOL NP-40 (70%), 106.47 g of styrene, 192.0 g of 2-ethylhexyl acrylate, 47.97 g of allyl methacrylate, 8.40 g of 2-ethylhexyl 3-mercaptopropionate, 59.97 g of methacrylic acid, and 1.675 g of the sodium salt of 2-acrylamido-2-methylpropanesulfonate was fed into the reactor at 8.375 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The reactor was cooled to 60° C., then 38.05 g of propylene imine dissolved in 64.8 g of water was pumped in at 3.4 g per minute. After the propylene imine feed was finished, the reactor was heated at 60° C. for 2 hours. An emulsion was prepared by stirring 132.2 g of acetoacetoxyethyl methacrylate, 1.97 g of TERGITOL NP-6, and 0.14 g of AEROSOL OT into 147.4 g of water which contained 1.97 g of TERGITOL NP-40 (70%). The acetoacetoxyethyl methacrylate emulsion was pumped into the amino-containing latex at 9.26 g per minutes at room temperature. The emulsion was cooled then filtered through 100 mesh wire screen. Solids level, 46.0%. Infrared analysis of clear films cast over zinc selenide showed an absorption at 1655 cm$^{-1}$ which represents an enamine moiety, and an absorption at 1638 cm$^{-1}$ which represents a methacrylate double bond moiety.

EXAMPLE 5

Solvent Resistance Studies of Clear Films from Example 4

Figure 2:
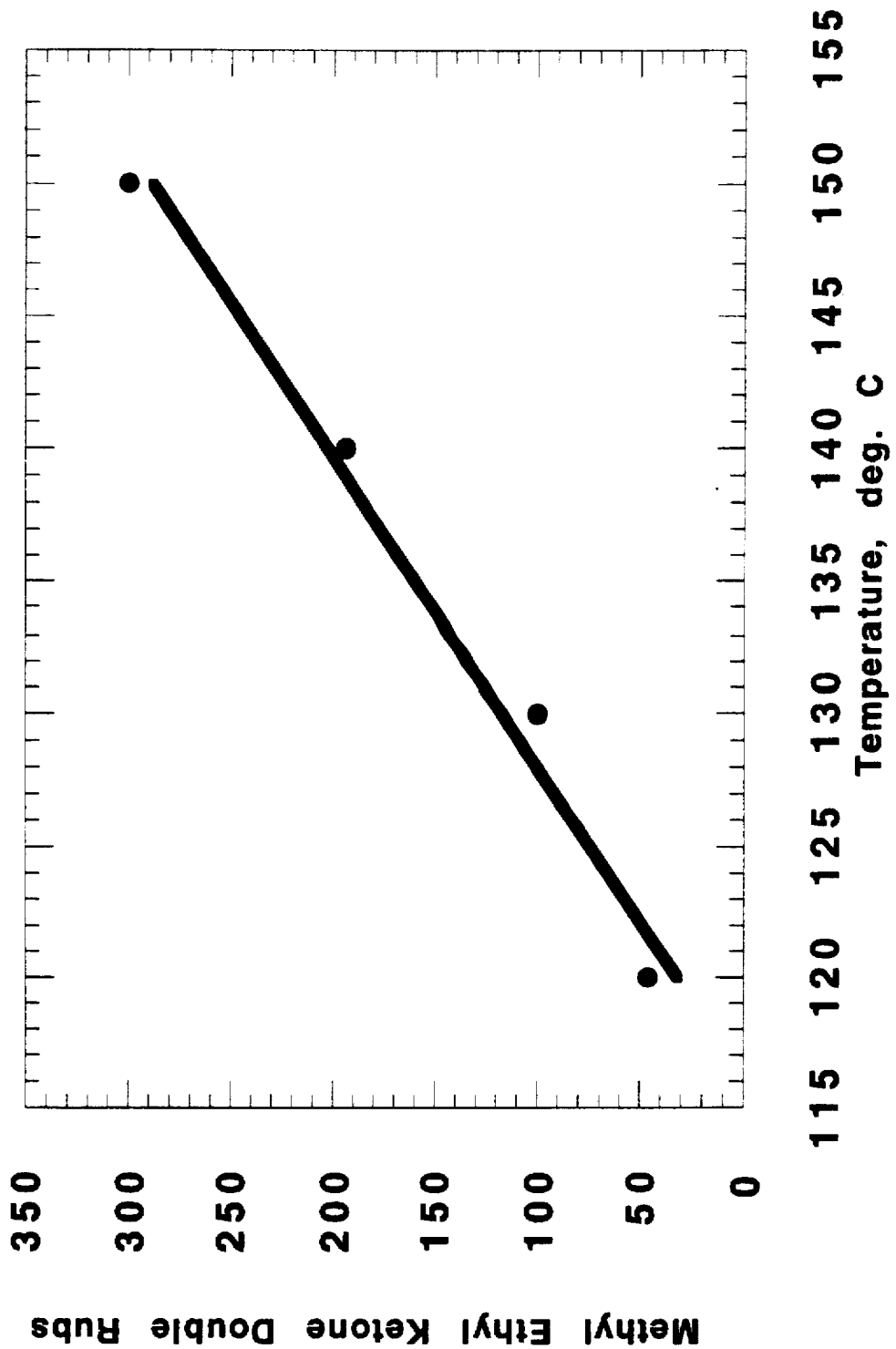
FIG. 2 is a plot of methyl ethyl ketone double rubs versus temperature (°C). This data shows the solvent resistance of a film prepared from an allyl-functional latex modified with propylene imine and AAEM as formulated in Example 5.

To 25 g of the latex prepared in Example 4 were added with stirring 0.59 g of TEXANOL ester alcohol (Eastman Chemical Company) (5 phr) and 0.12 g of AQUACAT cobalt drier (5% active on cobalt). The formulated emulsion was then stirred for 15 minutes, and 6 mil films (wet) drawn over ACT polished cold rolled steel panels (3"×9"×0.032"). The films were cured in a forced-air oven. The results are shown in FIG. 2. The results show that above 120° C., significant crosslinking takes place within 30 mins.

EXAMPLE 6

Preparation of a Styrene/Ethyl Acrylate-Base Latex Modified with Propylene Imine Followed By Acetoacetoxyethyl Methacrylate A monomer solution composed of 68.9 g of styrene, 172.2 g of ethyl acrylate, 79.2 g of methyl methacrylate, 13.8 g of methacrylic acid, 0.658 g of pentaerythritol triacrylate, and 1.3 g of Aerosol OT (75) was prepared. To a 1000 mL resin kettle equipped with a condenser, nitrogen purge, and subsurface feed tube were added 424.47 g of water, 3.44 g of AEROSOL OT (75), and 53.8 g of monomer solution. A nitrogen purge was begun, then the contents of the reactor brought up to 80° C. at 400 rpm. After reaching 75° C., the remaining monomer solution was pumped in over about 4 hours. After the monomer solution was fed into the reactor, the latex was post cooked for 30 minutes, then the reactor cooled to 60° C. After the emulsion polymerization reaction was completed, 6.86 g of propylene imine dissolved in 6.86 g of water was pumped into the reactor over 15 minutes, then the reactor held at 60° C. for 2 hours. After the propylene imine feed was finished, the reactor was cooled to room temperature, then an emulsion, prepared by stirring 23.8 g of acetoacetoxyethyl acrylate, 0.476 g of TERGITOL NP-4, and 0.0238 g of AEROSOL OT into 23.8 g of water which contains 0.50 g of TERGITOL NP-40 (70%), was fed into the reactor over 30 minutes. The emulsion was cooled, and the latex filtered through 100 mesh wire screen. Solids level, 42.4%; pH=7.2; Viscosity, 11 cps (LVT 1 at 60 rpm); MFFT, 17.7° C. Infrared analysis of clear films cast over zinc selenide showed an absorption at 1655 cm$^{-1}$ which represents an enamine moiety, and an absorption at 1638 cm$^{-1}$ which represents a methacrylate double bond moiety. FT-IR attenuated total reflectance analysis of the wet latex showed an absorption band at 1655 cm$^{-1}$ and an absorption at 1638 cm$^{-1}$. Experiments monitoring the formation of the enamine absorption on the surface of the latex after the addition of the AAEM show that enamine formation occurs at room temperature in less than one hour.

EXAMPLE 7

Solvent Resistance Studies of Clear Films from Example 6

To 25 g of the latex prepared in Example 6 were added with stirring 0.59 g of EKTASOLVE DM (5 phr), 5.91 g (2.5 phr) (or 11.82 g (5 phr)) of AQUACAT cobalt drier (5% active on cobalt). In addition, two commercial ambient-curable latexes, Rohm and Haas RHOPLEX E2950 and HYDUR 30, were formulated as described above except that only 5 phr of cobalt drier was used. After addition of the filming aids and cobalt drier, the formulated emulsions were then stirred for an additional 15 minutes, and 6 mil films (wet) drawn over ACT polished cold rolled steel panels (3"×9"×0.032"). The films were cured at room temperature (see FIG. 3).

EXAMPLE 8

Preparation of a Styrene/Ethyl Acrylate-Based Latex Activated by Propylene Imine Followed by t-Butyl Acetoacetate The emulsion was prepared, then modified with propylene imine as described in Example 6. The latex was then modified using the emulsion procedure described in Example 6 except that 19.00 g t-butyl acetoacetate was substituted for the acetoacetoxyethyl methacrylate. The modified latex was filtered through 100 mesh wire screen, 0.83 g of dried polymer collected; solids, 41.1%; pH, 7.8; viscosity 14 (LVT 1 at 60 rpm). Infrared Analysis of clear films cast over zinc selenide showed an absorption at 1647 cm$^{-1}$ which represents an enamine moiety. No absorption at 1638 cm$^{-1}$ was detected.

EXAMPLE 9

Solvent Resistance Studies of Clear Films from Example 8

Six mil films (wet) were drawn over ACT polished cold rolled steel panels (3"×9"×0.032"). The films were cured at 140° C. for 30 minutes. Solvent resistance studies showed that films cured under these conditions passed 200 methyl ethyl ketone double rubs.

EXAMPLE 10

Preparation of a Non-Reactive Core/Shell Styrene-acrylic Latex Control

To a 3000 mL resin kettle equipped with a condenser, nitrogen purge, and subsurface feed tube were added 640 g of water, 4.05 g of TREM LF-40, 1.93 g of TERGITOL NP-40 (70%), 7.3 g of sodium carbonate, 48.02 g of methyl methacrylate, 1.34 g of styrene, 60.22 g of 2-ethylhexyl acrylate, and 0.25 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 294.98 g of methyl methacrylate, 8.24 g of styrene, 369.91 g of 2-ethylhexyl acrylate, and 1.55 g of trimethylolpropane triacrylate was fed into the reactor at 8.375 g/min. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water, 12.79 g of AEROSOL 18, 5.09 g of TERGITOL NP-40 (70%), 230.28 g of styrene, 176 g of 2-ethylhexyl acrylate, 8.52 g of 2-ethylhexyl 3-mercaptopropionate, and 1.675 g of 2-acryl-amido-2-methylpropanesulfonate (AMPS) was fed into the reactor at 8.375 gamin. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The emulsion was cooled then filtered through 100 mesh wire screen. Solids level, 46.9% pH, 7.2; surface tension, 39.9 dynes/cm; particle size, 270 nm; amount of dried material (100 mesh screen), 0.5 g; and viscosity (Brookfield, LVT #1 spindle, 60 rpm), 18.4 cps.

EXAMPLE 11

Preparation of and Coating Properties of Low VOC Semigloss Paints using Emulsions from Example 1 and Example 10

Low VOC Grind:

A 15 gallon grind was prepared using a Premier disperser, as below, and a portion of the grind was used to letdown each specified paint.

| Material | Volume |
|---|---|
| DI Water | 40.00 |
| TAMOL 1124 | 4.00 |
| TRITON CF-10 | 2.00 |
| Ethylene Glycol | 2.00 |
| FOAMASTER AP | 2.00 |
| DOWICIL 75 | 1.00 |
| Disperse well then add under agitation: | |
| R-900 | 200.00 |
| Cowles until the grind passes 7+ Hegman add: | |
| DI Water | 25.00 |
| Filter through a Fulflo filter and store. | |

Paint Letdown:

| Material: | Example 1 Weight (g): | Examle 10 |
|---|---|---|
| Low VOC Grind | 297.15 | 345.00 |
| Emulsion | 515.4 | 598.40 |
| EKTASOLVE EB | 14.4 | 16.60 |
| FOAMASTER AP } Premix | 2.15 | 2.50 |
| FOAMASTER VF | 3.23 | 3.75 |
| HYDROCURE II | 2.75 | — |
| *DI Water | 109.99 | 127.7 |
| Adjust pH to 8.3 to 8.7 using 28% ammonia below: | | |
| NH₄OH | 1.0 | 0.10 |
| Then add: | | |

-continued

| Material: | Example 1 Weight (g): | Examle 10 |
|---|---|---|
| DI water } Premix | 64.6 | 75.00 |
| ACRYSOL RM-5 | 47.37 | 55.00 |
| Adjust pH to 8.3 to 8.7 using 28% ammonia below: | | |
| NH₄OH | 5.1 | 4.9 |
| Then add: | | |
| CELLOSIZE 4400H } Premix | 1.25 | 1.25 |
| DI Water | 25.0 | 25.0 |
| Resulting pH | 8.4 | 8.4 |
| KU Viscosity | 80 | 79 |
| 60 degree gloss | 63 | 72 |
| 20 degree gloss | 25 | 36 |

*Deionized Water

The block and print resistance properties of the Low VOC Semigloss Paints are shown below.

| Emulsion: | Face-to-Face | Block Resistance (days dry) | | | | Print Resistance (days dry) | | | |
|---|---|---|---|---|---|---|---|---|---|
| | | 1 | 2 | 7 | 21 | 1 | 2 | 7 | 21 |
| Example 1 | 1 day: | 2 | 1 | 1 | 1 | 1 | 1 | 1 | 1 |
| | 7 day: | 2 | 2 | 1 | 1 | 1 | 1 | 1 | 1 |
| Example 10 | 1 day: | 4 | 2 | 2 | 2 | 3 | 3 | 3 | 3 |
| | 7 day: | 3 | 2 | 2 | 2 | 3 | 3 | 3 | 3 |

EXAMPLE 12

Preparation and Coating Properties of Zero VOC Semigloss Paints Using Emulsions from Example 1 and Example 10

Zero VOC Grind:

A 15 gallon grind was prepared using a Premier disperser, as below, and a portion of the grind was used to letdown each specified paint.

| Material | Volume |
|---|---|
| DI Water | 48.00 |
| TAMOL 1124 | 4.00 |
| TRITON CF-10 | 2.00 |
| FOAMASTER AP | 2.00 |
| DOWICIL 75 | 1.00 |
| Disperse well then add under agitation: | |
| R-900 | 200.00 |
| Cowles until the grind passes 7+ Hegman then add: | |
| DI Water | 19.00 |
| Filter through a Fulflo filter and store. | |

Paint Letdown:

| Material: | Example 1 Weight (g): | Example 10 Weight (g): |
|---|---|---|
| Zero VOC Grind | 345.00 | 345.00 |
| Emulsion | 598.00 | 598.40 |
| DI Water } Premix | 6.25 | 6.25 |
| FOAMASTER AP | 2.50 | 2.50 |
| FOAMASTER VF | 3.75 | 3.75 |
| SURFYNOL 104 | 6.25 | 6.25 |
| HYDROCURE II | 2.75 | — |

-continued

| Material: | Example 1 Weight (g): | Example 10 Weight (g): |
|---|---|---|
| DI Water | 132.25 | 132.25 |
| Then adjust pH to 8.3 to 8.7 using 28% ammonia below: | | |
| NH₄OH | 0.40 | 0.37 |
| Then add: | | |
| DI water } Premix | 75.00 | 75.00 |
| ACRYSOL RM-5 | 50.00 | 50.00 |
| then adjust pH to 8.3 to 8.7 using 28% ammonia below: | | |
| NH₄OH | 6.30 | 6.51 |
| Then add: | | |
| CELLOSIZE 4400H } Premix | 0.49 | 1.06 |
| DI Water | 9.81 | 21.17 |
| Resulting pH | 8.4 | 8.5 |
| KU Viscosity | 78 | 80 |
| 60 Gloss | 64 | 68 |
| 20 Gloss | 26 | 31 |

The block and print resistance properties of the Zero VOC Semigloss Paints are shown below.

| Emulsion: | Face-to Face | Block Resistance (days dry) | | | | Print Resistance (days dry) | | | |
|---|---|---|---|---|---|---|---|---|---|
| | | 1 | 2 | 7 | 21 | 1 | 2 | 7 | 21 |
| Example 1 | 1 day: | 2 | 1 | 1 | 1 | 1 | 1 | 1 | 1 |
| | 7 day: | 2 | 2 | 1 | 1 | 1 | 1 | 1 | 1 |
| Example 10 | 1 day: | 4 | 2 | 2 | 2 | 3 | 3 | 3 | 3 |
| | 7 day: | 3 | 2 | 2 | 2 | 3 | 3 | 3 | 3 |

EXAMPLE 13

Preparation of an Allyl Group-Containing Latex Modified with Propylene Imine Followed by Acetoacetoxyethyl Methacrylate To a 3000 mL resin kettle equipped with a condenser, nitrogen purge, and subsurface feed tube were added 640 g of water, 4.05 g of TREM LF-40, 1.93 g of TERGITOL NP-40 (70%), 7.3 g of sodium carbonate, 48.02 g of methyl methacrylate, 12.74 g of styrene, 48.73 g of 2-ethylhexyl acrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 294.98 g of methyl methacrylate, 78.28 g of styrene, 299.34 g of 2-ethylhexyl acrylate, and 2.06 g of trimethylolpropane triacrylate was fed into the reactor at 8.375 g/min. Five minutes after the first emulsion feed was begun, an initiator solution composed of 4.36 g of sodium persulfate dissolved in 112 g of water was fed in at 0.536 g/min. After the first emulsion feed was completed, a second emulsion feed composed of 171 g of water, 12.79 g of AEROSOL 18, 5.09 g of TERGITOL NP-40 (70%), 148.83 g of styrene, 206 g of 2-ethylhexyl acrylate, 59.97 g of methacrylic acid and 1.675 g of 2-acrylamido-2-methylpropanesulfonate (AMPS) was fed into the reactor at 8.375 g/min. Five minutes after the last feed, an initiator solution of 1.34 g of t-butylhydroperoxide, and 1.34 g of sodium formaldehyde sulfoxylate dissolved in 40.2 g of water was charged and heating continued for 30 minutes. The reactor was cooled to 60° C., then 38.05 g of propylene imine dissolved in 64.8 g of water was pumped in at 3.4 g per minutes. After the propylene imine feed, the reactor was heated at 60° C. for 2 hours. An emulsion was prepared by stirring 132.2 g of acetoacetoxyethyl methacrylate, 1.97 g of TERGITOL NP-6, and 0.14 g of AEROSOL OT into 147.4 g of water which contained 1.97 g of TERGITOL NP-40 (70%). The acetoacetoxyethyl methacrylate emulsion was pumped into the amino-containing latex at 9.26 g per minutes, then held at 60° C. for 2 hours. The emulsion was cooled then filtered through 100 mesh wire screen. Solids level, 45.45%; pH, 7.68; particle size, 135 nm; and amount of dried material (100 mesh screen), 2.2 g. Infrared analysis of clear films cast over zinc selenide showed an absorption at 1655 cm$^{-1}$ which represents an enamine moiety, and an absorption at 1638 cm$^{-1}$ which represents a methacrylate double bond moiety.

EXAMPLE 14

Ambient Cure of Latexes of Examples 13 and 10

Film swell ratio and film gel fraction of films cast at 6 mils (wet) on release paper dried at 23° C. and 50% RH for various number of days are shown below:

| | Film Swell Ratio: | | Film Gel Fraction: | |
|---|---|---|---|---|
| Days Dry: | Ex. 13 | Ex. 10 | Ex. 13 | Ex. 10 |
| 1 day: | 3.3 | 7.3 | 88 | 48 |
| 7 day: | 3.2 | 7.5 | 89 | 49 |
| 22 day: | 2.9 | 7.5 | 91 | 48 |
| 28 day: | 2.7 | — | 90 | — |

EXAMPLE 15

Preparation of a Carboxylic Acid-Containing Latex

To a 3000 mL resin kettle equipped with a condenser, nitrogen purge, and subsurface feed tube were added 1200 g of water and 3.92 g of sodium bicarbonate. A nitrogen purge was begun, then the contents of the reactor brought up to 80° C. at 400 rpm. After reaching 80° C., an initiator charge composed of 10.68 g of potassium persulfate was added to the reactor and a monomer feed composed of 86.51 g of acrylonitrile, 1385.64 g of ethyl acrylate, 290.32 g of 2-ethyl acrylate, 42.90 g of acrylic acid, and 22.16 g of methacrylic acid was fed into the reactor at 8.375 gamin. Approximately 1.5 hours after the monomer feed was begun, an initiator solution composed of 1.60 g of potassium persulfate dissolved in 89 g of water was fed into the reactor at: 0.42 g/min. At the end of the initiator feed, the latex was heated at 80° C. for 30 minutes then cooled to 60° C. An initiator solution composed of 3.56 g of t-butyl hydroperoxide was charged then a feed composed of 3.56 g of sodium formaldehyde sulfoxylate dissolved in 34.18 g of water was fed in at 1.26 g/min. The latex was held at 60° C. for an additional 15 minutes. Total solids measured of the latex; 57.91%.

EXAMPLE 16

Modification of Latex of Example 15 by Propylene Imine Followed by Acetoacetoxyethyl Methacrylate In a 3000 mL resin kettle equipped with a condenser, 1597.97 g of latex from Example 15 was brought to 60° C. and then a solution of 18.23 g of propylene imine dissolved in 72.92 g of water was pumped in at 3.4 g/minute. After the propylene imine feed was finished, the reactor was heated at 60° C. for 2 hours then cooled to 25° C. An emulsion was prepared by stirring 68.43 g of acetoacetoxyethyl methacrylate, 0.68 g of TERGITOL NP-6, and .068 g of AEROSOL OT into 53.76 g of water which contained 0.77 g of TERGITOL NP-40 (70%). The acetoacetoxyethyl methacrylate emulsion was pumped into the amino-containing latex at 9.26 g per minutes. After the feed was finished, the latex was stirred for 15 minutes. The emulsion was then filtered through 100 mesh wire screen. Solids level, 55.22%.

EXAMPLE 17

Cobalt Formulation of Example 16

To 100 g of the latex of Example 16 was added with stirring 0.48 g of cobalt AQUACAT drier (5% active on cobalt). The formulated emulsion was stirred for 15 minutes.

EXAMPLE 18

Baked Cure of Latex films of Examples 15, 16 and 17

Six-mil films of the Examples 15, 16 and 17 were drawn down over release foil and film samples were cured at 80° C., 120° C. and 150° C. for 30 minutes in a forced-air oven. Film gel fractions and film swell ratios of the films were then determined.

|  | Film Gel Fraction/Film Swell Ratio | | |
|---|---|---|---|
|  | 80° C.: | 120° C.: | 150° C.: |
| Example 15 | 1/48 | 1/59 | 1/55 |
| Example 16 | 50/40 | 70/22 | 91/10 |
| Example 17 | 78/15 | 85/10 | 91/9 |

We claim:

1. An allyl-functional polymer having one or more pendant side chains connected thereto, wherein said pendant side chains contain an enamine moiety having the formula

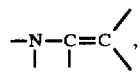

wherein said enamine moiety is bonded to said polymer via a nitrogen atom.

2. A polymer having the formula

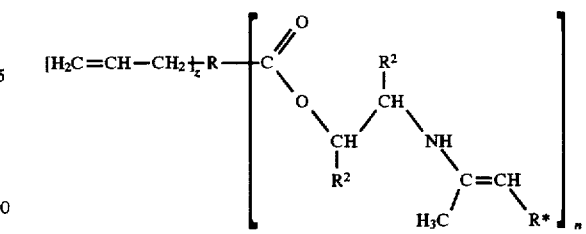

wherein R is a polyvalent group having a number average molecular weight of about 2500 to 1,000,000, n is an integer of from about 2 to 100, Z is an integer of from 2 to 500, $R^2$ is independently hydrogen or methyl, and $R^*$ is a $C_1$–$C_{20}$ hydrocarbyl radical.

3. A polymer having the formula

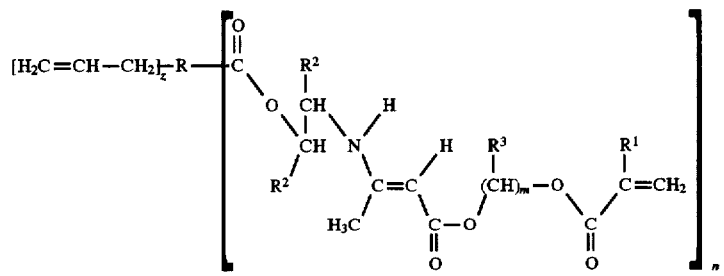

wherein R is a polyvalent group having a number average molecular weight of about 2500 to 1,000,000, n is an integer of from about 2 to 100, Z is an integer of from 2 to 500, m is an integer of about 2 to 5, $R^1$ is hydrogen or $C_1$–$C_6$ alkyl, $R^2$ is independently hydrogen or methyl, and $R^3$ is hydrogen or a $C_1$–$C_6$ alkyl.

4. A curable polymer composition comprising the reaction product of an amine-functional polymer having free allyl functionality and a compound of Formula (1)

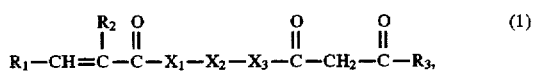

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ alkylene or $C_3$–$C_{12}$ cycloalkylene;

or a $C_1$–$C_8$ alkyl acetoacetate or $C_2$–$C_8$ alkenyl acetoacetate.

5. The polymer of claim 4, wherein said polymer possesses sufficient pendant ethylenic unsaturation to effect crosslinking at temperatures as low as about −10° C.

6. The polymer of claim 3, wherein $R^1$ is methyl and one of $R^2$ is hydrogen and the other $R^2$ is methyl.

7. The polymer of claim 3, wherein both of $R^2$ are hydrogen, and $R^1$ is methyl.

8. The polymer of claim 1, wherein said polymer when applied to a substrate to form a film and exposed to ambient temperatures for a period of at least about 3 days, remains unpenetrated when subjected to about 100 methylethylketone double rubs.

9. The polymer of claim 6, further comprising pendant acetoacetyl moieties, wherein said moieties are optionally stabilized by reaction with ammonia or a primary or secondary amine.

10. The polymer of claim 4, wherein the compound of Formula (1) is selected from the group consisting of acetoacetoxyethyl methacrylate, acetoacetoxyethyl acrylate, acetoacetoxypropyl methacrylate, acetoacetoxypropyl acrylate, acetoacetoxybutyl acrylate, and acetoacetoxy (methyl)ethyl acrylate.

11. The polymer of claim 4, wherein the $C_1$–$C_8$ alkyl acetoacetate or the $C_2$–$C_8$ alkenyl acetoacetate is t-butyl acetoacetate, methyl acetoacetate, ethyl acetoacetate, or allyl acetoacetate.

12. A polymeric particle having a mean diameter of about 35 to 350 nm, said particle comprising the reaction product of an amine-functional polymer having free allyl functionality and a compound of Formula (1)

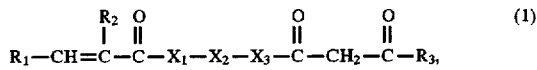

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ alkylene or $C_3$–$C_{12}$ cycloalkylene; or a $C_1$–$C_8$ alkyl acetoacetate or $C_2$–$C_8$ alkenyl acetoacetate.

13. The particle of claim 12, wherein said particle possesses sufficient pendant ethylenic unsaturation to effect free-radical flux when cast on a substrate as a film and exposed to oxygen at temperatures of greater than about –10° C.

14. The particle of claim 12, wherein the compound of Formula (1) is selected from the group consisting of acetoacetoxyethyl methacrylate, acetoacetoxyethyl acrylate, acetoacetoxypropyl methacrylate, acetoacetoxypropyl acrylate, acetoacetoxybutyl acrylate, and acetoacetoxy (methyl)ethyl acrylate.

15. The polymeric particle of claim 12, wherein said particle is in the shape of a peanut shell, a multilobe form, an acorn form, a raspberry form, or in the shape of an "O".

16. A waterborne coating composition comprising a blend of water; an allyl-functional polymer having one or more pendant side chains connected thereto, wherein said pendant side chains contain an enamine moiety having the formula

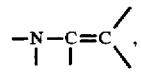

wherein said enamine moiety is bonded to said polymer via a nitrogen atom; and optionally one or more water-dispersible polymers selected from the group consisting of polyesters, polyester-amides, cellulose esters, alkyds, polyurethanes, epoxy resins, polyamides, acrylics, and vinyl polymers.

17. The coating composition of claim 16, further comprising one or more fillers and/or pigments.

18. An article coated with the composition of claim 16.

19. The article of claim 18, wherein said article is selected from the group consisting of wood, wood by-products, gypsum board, metal, plastic, concrete, masonry, and textile products.

* * * * *